United States Patent
Barford et al.

(10) Patent No.: US 7,907,543 B2
(45) Date of Patent: Mar. 15, 2011

(54) APPARATUS AND METHOD FOR CLASSIFYING NETWORK PACKET DATA

(75) Inventors: Paul R. Barford, Madison, WI (US); David J. Plonka, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 121 days.

(21) Appl. No.: 12/464,350

(22) Filed: May 12, 2009

(65) Prior Publication Data

US 2010/0290353 A1 Nov. 18, 2010

(51) Int. Cl.
*H04L 12/26* (2006.01)
(52) U.S. Cl. ........................................ 370/252
(58) Field of Classification Search .................. 370/241, 370/242, 246, 250, 252, 395.5, 395.52, 395.54; 709/223–224
See application file for complete search history.

(56) References Cited

U.S. PATENT DOCUMENTS

| | | | |
|---|---|---|---|
| 7,792,994 B1 * | 9/2010 | Hernacki | 709/245 |
| 2006/0140182 A1 * | 6/2006 | Sullivan et al. | 370/389 |
| 2007/0180090 A1 | 8/2007 | Fleischman et al. | |
| 2010/0257266 A1 * | 10/2010 | Holmes et al. | 709/224 |

OTHER PUBLICATIONS

Plonka et al, Context-aware Clustering of DNS Query Traffic, ACM, 13 pages, 2008.*
Barford et al, A Signal Analysis of Network Traffic Anomalies, ACM, 12 pages, 2002.*

* cited by examiner

*Primary Examiner* — Frank Duong
(74) *Attorney, Agent, or Firm* — Boyle Fredrickson, S.C.

(57) ABSTRACT

A network monitor provides improved understanding of the type of data being transmitted by packets by capturing rendezvous packets, such as domain name server queries and responses, to extract text domain names that may then be associated with later packets using a common numeric addresses. Text domain names intended for human understanding and recollection provide a unique insight into the content of the packets not readily obtained by analysis of the packet data itself.

12 Claims, 4 Drawing Sheets

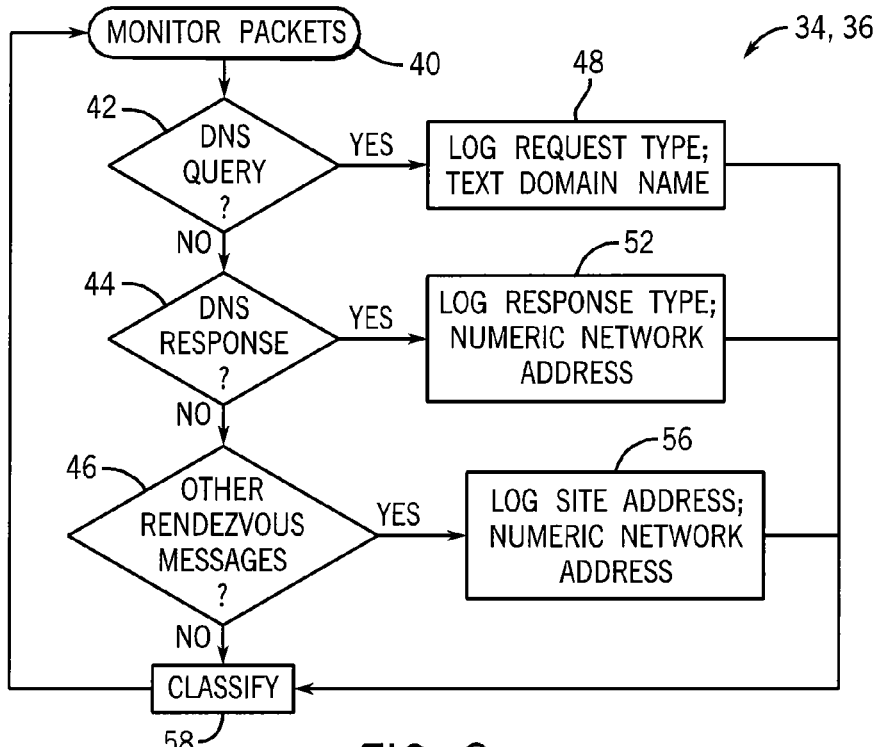
FIG. 3
| 1 | DNSQ | CLIENT A. WARF.ORG | PAGE | WWW.NSF.ORG | A | |
|---|---|---|---|---|---|---|
| 2 | DNSR | CLIENT A. WARF.ORG | PAGE | 123.45.67.890 | NO ERROR | 2 |
| 3 | DNSQ | CLIENT B. CS. WISC.EDU | VOIP | WWW.SKYPE.COM | A | |
| 4 | DNSR | CLIENT B. CS. WISC.EDU | VOIP | 123.56.78.901 | NO ERROR | 2 |
| 5 | OTHER | CLIENT B. CS. WISC.EDU | VIDEO | (SKYPE) | — | |
| 6 | OTHER | CLIENT B. CS. WISC.EDU | VIDEO | 192.0.2.1 | — | |
| 7 | | | | | | |
FIG. 4
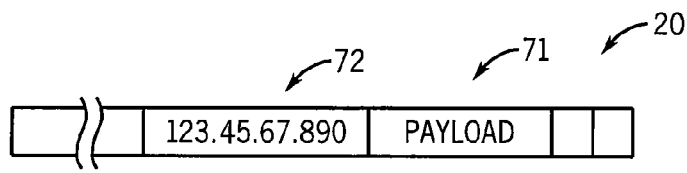
FIG. 5

FIG. 6
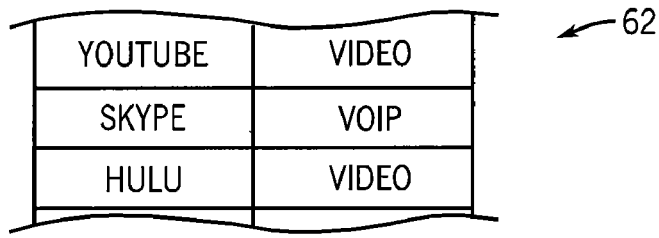
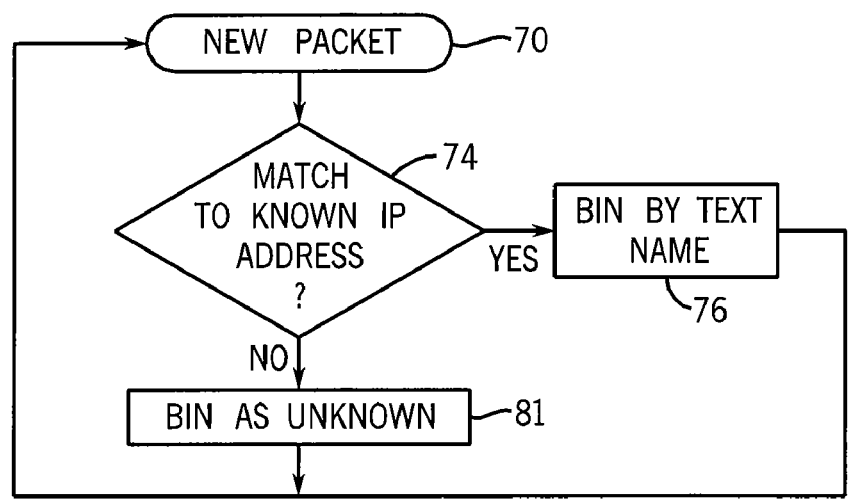
FIG. 7
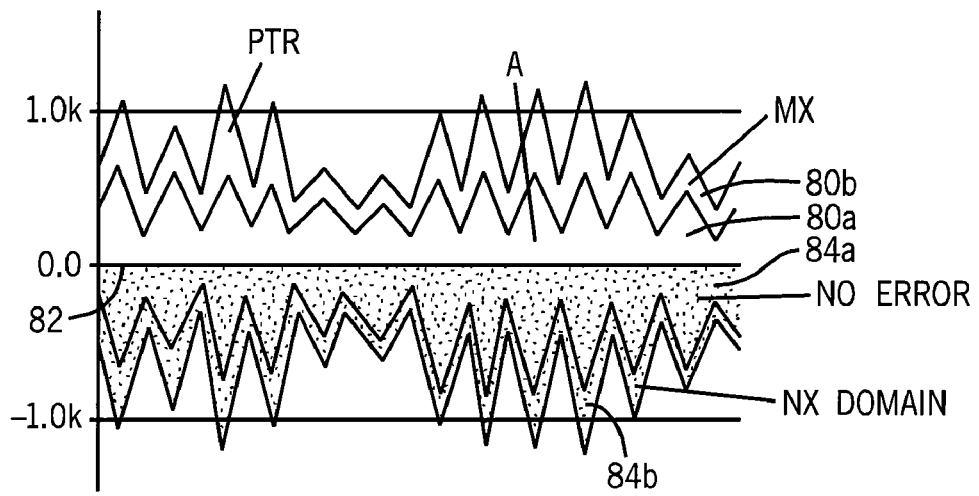
FIG. 8

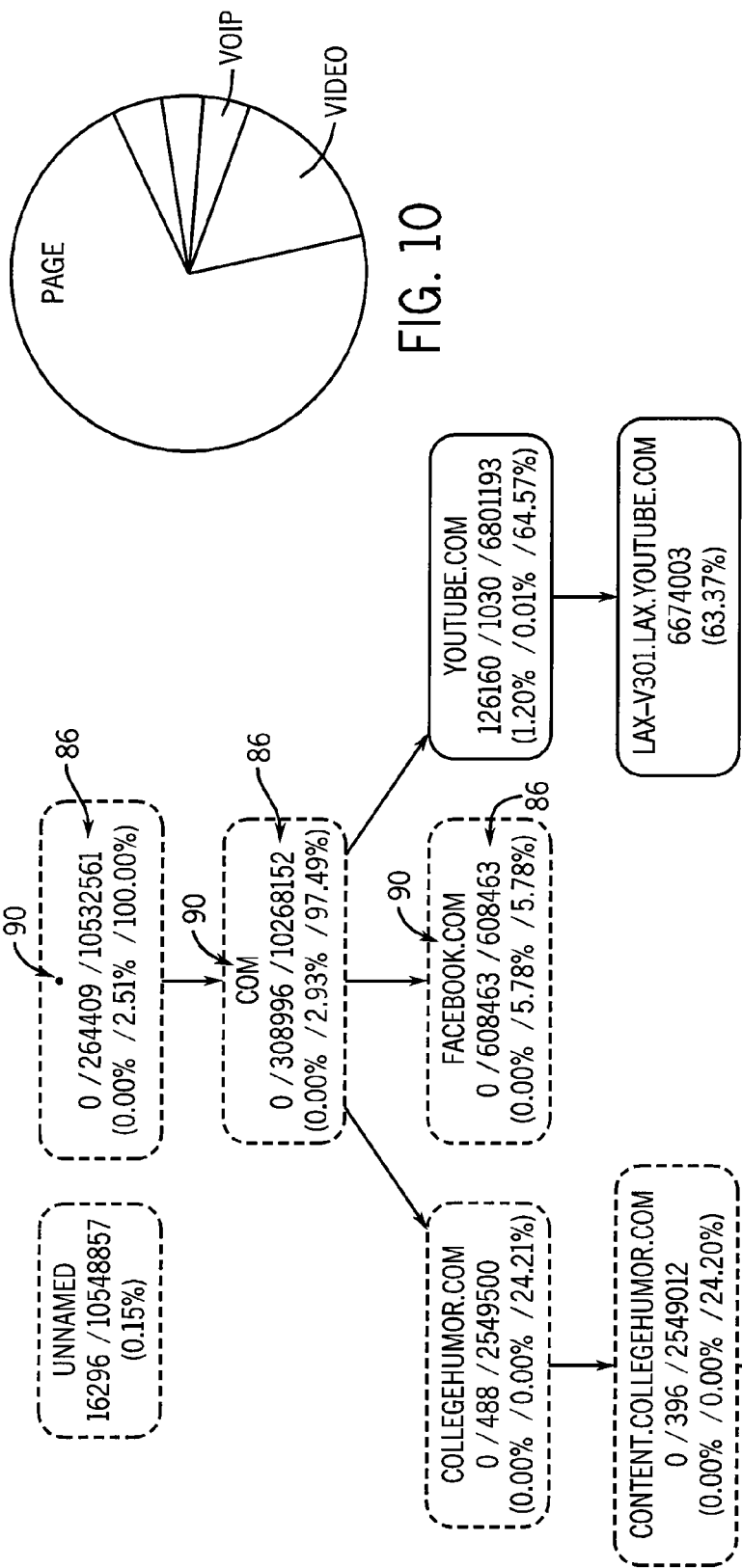

APPARATUS AND METHOD FOR CLASSIFYING NETWORK PACKET DATA

This invention was made with United States government support awarded by the following agency: NSF 0347252. The United States government has certain rights in this invention.

BACKGROUND OF THE INVENTION

The present invention relates to systems for monitoring network traffic on a computer network such as the Internet and, in particular, to a system providing improved classification of network packets.

Networks, such as the Internet, communicate message data by means of discrete packets each having a "payload" (typically a portion of the message data to be communicated) coupled to packet control data such as a destination address. The packets are transmitted individually onto the network to be routed by multiple intermediate autonomous devices, such as routers, according to the attached destination address. The packets are received at the destination address to be reassembled into the message data. Packet communication protocols allow flexible and efficient high-speed data transmission over networks with complex and dynamic topologies.

The payload of a given packet may carry message data from a variety of "message categories" describing the type of message data and its use. For example, packets may carry message data of different types including text, images, audio, and other data. The message data may be used in real-time communication, for example, voice over Internet (VOIP) telephone conversations, streaming video, or the like, or may be a relatively time insensitive data file transfer.

It would be desirable, for reasons of network management, security, and research, to be able to identify and sort the packets according to the message categories. For example, it might be desirable to limit the proportion of the bandwidth of a network dedicated to time insensitive transfers of large computer files, for example, through peer-to-peer (P2P) applications, in favor of time critical voice telephone communications. Identification of the message category of a packet could also be important for security purposes to block malicious traffic. A deeper insight into the message categories of packets being transmitted could also aid in the study of networks and thus provide a useful research tool.

Inspection of the packets themselves provides very little information about the message category. For example, payload data for an individual packet transferring image data can be identical or indistinguishable from payload data for an individual packet transmitting a portion of a telephone conversation. The possibility of encryption and compression of payload data makes any attempt to discern the message category from payload data even harder.

Packets transmitted under Internet Protocols, such as the Transmission Control Protocol (TCP) or User Datagram Protocol (UDP), may include in the packet control data a port number associated with different types of services. For example, specific ports may be assigned to protocols developed for different message categories including the protocols of: File Transfer Protocol (FTP), Simple Mail Transfer Protocol (SMTP), and Hyper Text Transfer Protocol (HTTP). These protocols provide only a very coarse view of the message category. This is particularly true because so many developing applications for a wide range of message categories simply use HTTP, defeating simple classification using port numbers. Port numbers have even less value with respect to malicious traffic where there is strong incentive to actively obfuscate any indication of the classification of the payload by port number.

For this reason, fine-grained classification of packets by message category currently relies on one of two techniques. The first generally tries to match the data of packet payloads with one of a library of signatures composed of unique byte sequences associated with particular applications. This technique is widely used in attempting to identify malicious traffic. The problem of this approach is that byte sequences are often not unique to a particular message category and, of course, for malicious traffic techniques, are used to actively thwart signature matching.

The second technique focuses on building statistical models of "transport layer metrics" such as connection duration and packet size. Statistical techniques such as cluster analysis and machine learning can then divide packets into message categories based on similarity of the transport layer characteristics. Again statistical fingerprints may fail to distinguish many important packet classifications.

Ideally, any classification system for packets must operate at extremely high rates so as to provide comprehensive and timely analysis of network traffic.

SUMMARY OF THE INVENTION

The present inventors have recognized that although the vast majority of packets offer very little information about their data categories, a small percentage of the packets related to so-called "rendezvous" mechanisms, where communication between two devices is coordinated, can provide a rich source of categorization information. In particular, communication of multiple packets between two computers is often preceded by a query and response between a computer and a domain name server (DNS) used to convert a text destination address to its numeric equivalent. The text destination name, unlike the numeric destination address, is intended as a mnemonic and thus contains contextual information that can reveal the message category. In addition, the information from this rendezvous mechanism can provide more accurate grouping of packets when a single destination address receives multiple message categories. Because the packets associated with the rendezvous mechanisms typically form a small fraction of the total network traffic, monitoring and processing data packets is compatible with high-speed classification of packets.

Specifically then, the present invention provides a network packet monitor for networks that permit intercommunication of data among computers by means of packets having numeric network destination addresses. The monitoring tool includes one or more network taps for reading packets passing through a point (or points) on the network and a packet monitor communicating with the network tap to identify domain name server response packets responding to a domain name query in which a text domain name is converted into a numeric network address. A database stores in association at least one of a numeric network source address and a numeric network destination address, with a text domain name, all collected from the monitored packets. The database is used by a packet characterizer communicating with the network tap to identify the general IP packets not associated with the rendezvous mechanism (e.g., DNS) by matching at least one of a numeric network source address and numeric network destination address of the packets to associated text domain names in the database.

It is thus a feature of at least one embodiment of the invention to provide a deeper understanding of the message categories of packets by associating packets with a text domain name such as may reveal essential information.

The network packet monitor may output a report describing statistics of packets at the point on the network divided according to text domain names of the packets from the packet characterizer.

It is thus a feature of at least one embodiment of the invention to provide improved insight in network statistics.

The network monitor may further include a database linking text domain names to message categories of packet data, wherein the statistics of the packets are divided according to message categories.

It is thus a feature of at least one embodiment of the invention to use text domain names (or lack thereof) to broadly classify packets according to message categories. The message categories may, for example, be "data use" categories, for example, indicating whether the data is time critical (such as associated with telephony or video streaming) or not, or may be "datatype" categories indicating what the data represents (such as text, images, video, etc.)

It is thus a feature of at least one embodiment of the invention to provide network statistics associated with message categories.

The text domain name stored in the database may include both domain and subdomain names and the report may be a tree diagram showing statistics for text domain names, each arranged according to a hierarchy of the text domain names.

It is thus a feature of at least one embodiment of the invention to provide an improved representation in network traffic that places domain and subdomain destination addresses in context.

Alternatively, the report may be a graph showing volumes of packets associated with different text domain names.

It is thus a feature of at least one embodiment of the invention to provide time profiles of network traffic that can better reveal the source of excess demand.

The database may further store domain name server query types for domain name server query packets and domain name server response codes for the domain name server response packets, and wherein the packet log generates a report indicating a plot of query types as a function of time on one side of a time axis and a plot of response codes as a function of time, aligned with the query types, on the other side of the time axis.

It is thus a feature of at least one embodiment of the invention to provide a unique insight into DNS traffic and, in particular, unwanted and overloaded traffic.

The packet monitor may further identify response packets in non-domain name server rendezvous communications in which a text domain name is converted into a numeric network address.

It is thus a feature of at least one embodiment of the invention to provide insight into large numbers of packets based on any rendezvous type message exchange.

The invention may further include a packet controller allocating network bandwidth on the network according to the text domain name associated with the packet by the packet characterizer.

It is thus a feature of at least one embodiment of the invention to enlist the present technique and quality of service improvements or network access control (e.g., malware blocking).

The invention may further use rendezvous type message exchanges to categorize the client hosts that utilize given rendezvous mechanisms (e.g., DNS), in addition to categorizing traffic that a client host exchanges.

It is thus a feature of at least one embodiment of the invention to observe host rendezvous behavior to categorize network hosts themselves, thus further informing and refining the categorization of their traffic.

These particular features and advantages may apply to only some embodiments falling within the claims and thus do not define the scope of the invention.

BRIEF DESCRIPTION OF THE DRAWINGS

FIG. 3 is a flow chart of the steps executed by the network taps, packet monitor and first database of FIG. 2;

FIG. 4 is a simplified representation of records in the database of FIG. 1 based on information obtained from the packet monitor observing rendezvous packets;

FIG. 5 is a simplified packet showing its destination address;

FIG. 6 is a figure similar to that of FIG. 4, showing records in the second database linking text domain names to message categories;

FIG. 7 is a flow chart showing the steps executed by the packet classifier of FIG. 1;

FIG. 8 is an output chart that may be produced by the packet log showing DNS traffic alone;

FIG. 9 is a tree diagram showing network traffic arranged according to domain name hierarchy; and FIG. 10 is a simple pie chart showing different message categories of a sampling of network messages.

DETAILED DESCRIPTION OF THE PREFERRED EMBODIMENT

Figure 1:
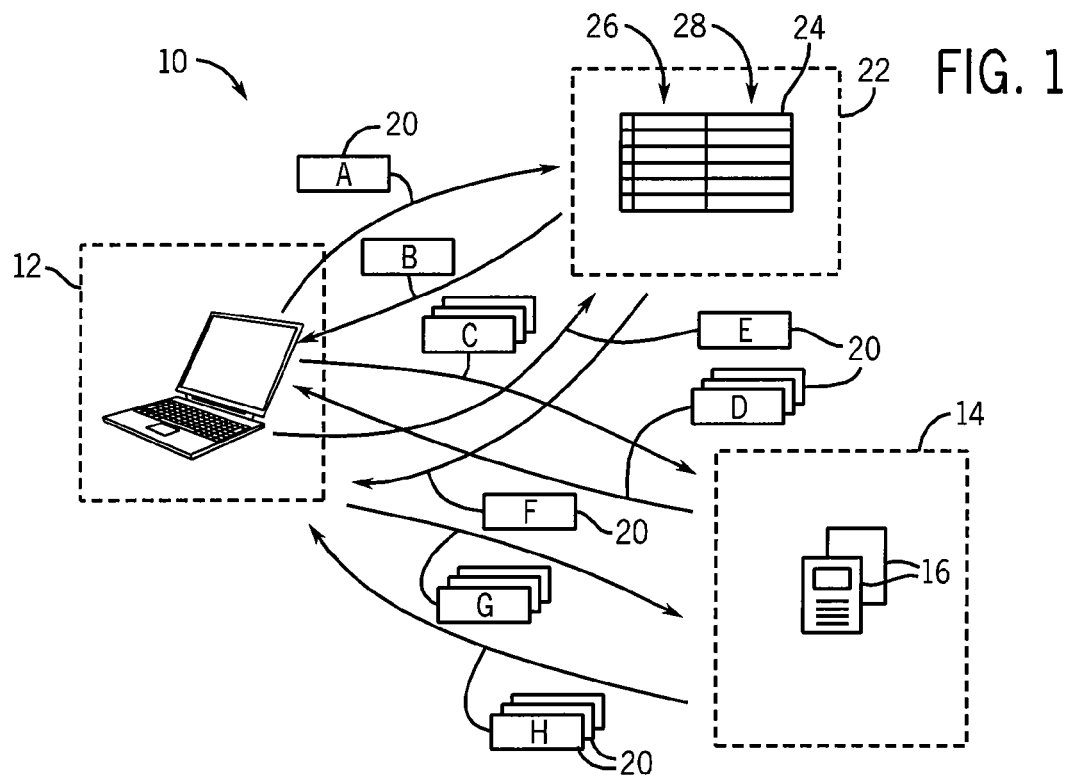
FIG. 1 is a representation of typical data flows between a browsing Web client, a domain name server, and a Web server to which the browser is connecting, exploited by the present invention.

Referring now to FIG. 1, a packet-based computer network 10, such as the Internet, may provide for communication between client devices 12 and a server 14. The client device 12 may, for example, be a standard personal computer running a web browser program, and the server 14 a special-purpose server computer executing a Web server program. The server 14 may serve one or more webpages 16 or other types of data via multiple data packets 20 exchanged over the computer network 10.

Referring momentarily to FIG. 5, data packets 20 provide a payload section 71 holding the data of the webpages 16, for example, attached to a numeric destination address 72. The numeric destination address 72 allows the packet 20 to be correctly forwarded through various network routers and the like (not shown) between the client device 12 and the server 14. Data packets 20 passing from the client device 12 to the server 14 will have a destination address of the server 14 while data packets 20 passing from the server 14 to the client device will have a destination address of the client device.

The destination address (an IP address for the Internet) is typically in the form of a number (for example: 192.0.2.166 for Internet protocol version 4 (IPv4) or 2001:0DB8:4545:3: 200:f8ff:fe21:67cf for Internet protocol version 6 (IPv6)). These numeric destination addresses are unwieldy and difficult to remember and accordingly the user of the client device 12 will normally ignore the numeric destination address in favor of a text domain name (for example, www.example- .com) that may be easily remembered and typed by the user of the client device 12 into the browser address bar. The numeric network address or its equivalent will henceforth be termed a "numeric network address" while the text equivalent will be termed a "text domain name".

The translation between the text domain name and a numeric network address may be performed by name server 22, for example, a Domain Name System (DNS) on the Internet. Before connecting to a particular server 14, the client device 12 sends a domain name server query (DNSQ), indicated by packet A, to a domain name server 22. This packet A includes a text domain name query for the numeric network address of the server 14 and a numeric network address of the client device 12 to which a response should be sent. The domain name server 22 provides a database 24 linking text domain names 26 to corresponding numeric destination addresses 28, and, upon receiving the DNSQ of packet A, looks up the numeric network address associated with the received text domain name and returns the numeric network address to the client device 12 in a domain name server response (DNSR) packet B using the numeric network address of client device 12 obtained from packet A as the destination of the response.

The client device 12, receiving the response, may then send a webpage request packet C (or other similar packet) directly to the server 14 using the numeric destination address provided by the name server 22 in packet B. The server 14 in response may serve multiple packets D, representing the data from a webpage 16, to the client device 12. These packets D together may represent the data of a webpage 16.

One of these packets D, for example, may provide a link on the served webpage 16, the link indicating a text domain name address of another webpage, for example, holding an image or providing a hyperlink. If the user of the client device 12 or the loaded webpage 16 invokes the link, a new DNSQ packet E will be sent to the name server 22 which will reply with a numeric destination address in a response packet F analogous to the process described before. The client device 12 may then request the link information from the server 14 (or another server 14) using packet G incorporating the numeric destination address just obtained from the name server 22. Afterwards, the client device 12 may receive multiple packets H in response representing the data of a link.

The domain name serving process is greatly simplified in this example and may involve redirection by the initial name server to another name server and various levels of iteration through different name servers as different levels of the domain name are resolved. Domain name servers may also provide for other types of information as will be discussed briefly below and may return error codes in situations where the requested text domain name could not be resolved.

Generally, domain name queries and responses represent a relatively low number of packets on the network but precede the exchange of most intercommunication among devices on the network and frequently delimit changes in message categories of network traffic.

Figure 2:
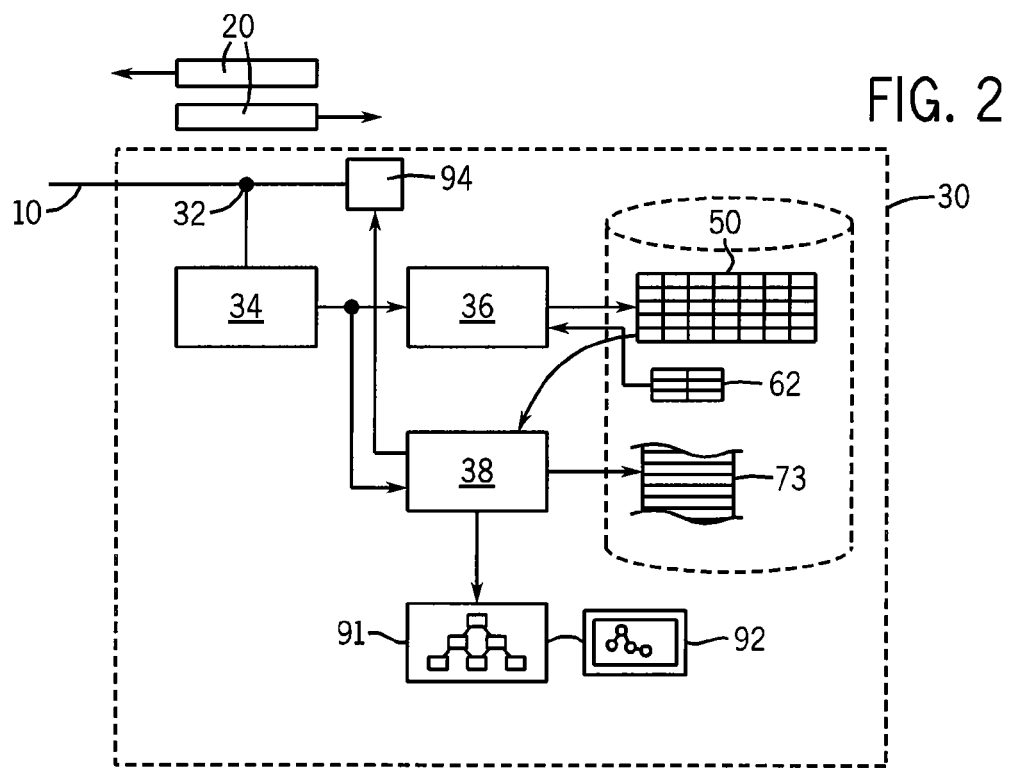
FIG. 2 is a block diagram of the network monitor of the present invention including one or more network taps, a packet monitor, two databases, a packet classifier, a packet log, and a packet controller.

Referring now to FIG. 2, the present invention may be implemented by a standard electronic computer 30 including, for example, a processor, memory (including but not limited to random access memory, read-only memory, and magnetic disk memory, for example) network cards, such as an Ethernet card, and an operating system such as Windows or UNIX type operating systems. In use, the electronic computer 30 is attached to the network 18 at one or more network point 32 to read packets 20 passing the network points 32 and to process them as will be described, through a number of software or hardware implemented functional blocks that will now be described. It will be understood that the division of functions among these functional blocks can be readily varied without changing the underlying operation of the invention, and hence the division of function should not be considered critical unless specified as such.

The first functional block provides for a network tap 34 which provides for low level processing of the packets. Each packet 20 passing by the network points 32 is read by the network tap 34 (which may handle multiple network points 32) and forwarded respectively to a packet monitor 36 and to a packet classifier 38.

The packet monitor 36 identifies packets 20 related to rendezvous mechanisms between computers on the network 18, that is, communications between computers to resolve a text version of a network address into a numeric network address. In the preferred embodiment, the packet monitor 36 identifies those packets 20 communicated between client devices 12 on the network 18 and one or more domain name servers 22 by comparing the packet numeric destination address to a list of known addresses of domain name servers 22. The particular domain name servers 22 identified by the packet monitor 36 may be limited to, for example, zone-authoritative name servers to avoid rogue DNS servers.

The packet monitor 36 may also identify other rendezvous mechanisms not limited to those with DNS servers, for example, rendezvous mechanisms implemented by a VOIP server allocating calls to different computers. Again, these packets may be identified by comparison of the destination addresses of the packets to a list held by the packet monitor 36. Rendezvous packets may also be identified by other techniques specific to a given rendezvous mechanism, for example, by a pattern of queries and responses using known query and response codes alone or coupled with a list of addresses or domains for name servers.

The packet monitor 36 may be further set to detect and eliminate (or segregate for separate logging) rendezvous packets associated with overloaded domain name server traffic. "Overloading" refers to the use of a domain name server for activities other than serving numeric addresses. One such common overloaded activity is the storage of blacklists or whitelists to block spam or malicious traffic. This overloading is utilized by a client device 12 wishing to identify whether a particular address is, for example, blacklisted. The client device 12 reformulates the numeric address of the questionable site as a domain name query and the domain name server returns an address (outside of the normal address domain) indicating that the submitted address is in the list (i.e. blacklisted) or a NXDOMAIN (no such domain) error code indicating if the address is not in the list. These overloaded rendezvous packets may be identified by the return address (which as noted is outside of the normal address domain) or by the unique formulation of the submitted text domain name which incorporates numeric codings.

Referring to FIG. 3, the operation of the network tap 34 is represented by process block 40, which provides packets to succeeding decision blocks 42, 44, and 46 implemented by the packet monitor 36. At decision block 42, the packet monitor 36 assesses each packet to see if it is a DNSQ packet (that is, from a client device 12 requesting translation of the text domain name into a numeric address). If so, as indicated by process block 48, the packet monitor 36 logs a request type and the text domain name is logged in a first database 50 as will be described in detail below.

If the packet is not a DNSQ packet but is a DNSR packet (that is, from the name server 22 providing translation of the text domain name into a numeric address), as evaluated at decision block 44, the packet monitor 36, at process block 52, logs a response type, the text domain name, and the responsive numeric address is logged in the first database 50. This logging process may investigate whether there was a previous corresponding DNSQ packet and, if so, confirms and merges these records.

If the packet is neither a DNSQ nor DNSR packet, then at decision block 46 it is evaluated as to whether it is a packet associated with another type of rendezvous protocol, and if so, at process block 56, the effective query packet and response packets are examined to capture the returned numeric address. Typically, this process will also involve recording query and response messages and reconciling them in the database 50.

In all cases, the packets 20 are then passed to the packet classifier 38 as indicated by process block 58.

Referring now momentarily to FIG. 4, the database 50 may thus contain a set of records 60 (represented by rows) storing data about rendezvous related packets as fields (represented by columns). In this example, a first column may be a database key field used for database management. A second column is a message type, in this case being of three kinds (1) a domain name server query (DNSQ); (2) a domain name server response (DNSR); and (3) an alternative rendezvous packet(s) not involving a domain name server (Other).

The third column provides the source address of the query (here represented as a text domain name for clarity, but typically being a numeric network address). The fourth column optionally indicates a message category of packets associated with this numeric network address as will be described below.

The fifth column provides, in the case of a DNSQ packet, the text domain name being submitted with the query. In the case of a DNSR message, the fifth column provides the returned, resolved numeric network address. In the case of a rendezvous message not handled by a domain name server, the fifth column provides application-specific rendezvous information that best reveals information about the packet types. For example, a query message to numeric address 192.0.2.12 may represent, for example, the site of a known VOIP service (e.g., Skype as shown in parentheses and determined by earlier DNS packets), thus characterizing the message type. This query message then returns the address 192.0.2.1, in this example being a numeric network address of an available virtual phone host. Thus packets 20 having this numeric network address may then be associated with VOIP traffic.

As noted above, the records for the DNSQ, DNSR, and rendezvous packets, as shown, may be assembled from a series of requests and replies through multiple domain name servers and simply represents the ultimate result of that process as will be understood to those of ordinary skill in the art.

The sixth column provides, in the case of a domain name server, the type of query for a DNSQ message, and for a DNSR message, the error code. For example, a typical name server query may have a type of A (address record) requesting a mapping of a text domain name to a numeric address. Other common message types include MX (mail exchange), PTR (pointer to a canonical name, e.g., for reverse DNS lookups), SRV (service locator), and TXT (text record), whose meaning and significance will be understood to those in the art. Common result codes, include, for example, NOERROR (indicating that the name serving process was successful and the return to numeric address was correctly provided), FORMERR (format error), SERVFAIL (server failure), NXDOMAIN (non-existent domain (text domain name doesn't exist)), NOTIMP (not implemented), and REFUSED (query refused).

The final or seventh column of the database 50 may include a "time-to-live" value typically provided in responses from domain name servers indicating how long the information should be cached. This time-to-live value may be used for maintenance of the database 50 permitting erasure of entries after the time-to-live value has expired or a predetermined time after the expiration.

Referring to FIGS. 2 and 6, the packet monitor 36 may work in conjunction with a message category database 62 generally linking numeric addresses of the type found in column five of the database 50 for DNSR packets to particular generic message categories. Thus, for example, numeric addresses associated with YouTube (shown here as a text domain name for clarity) might be broadly characterized as related to the video message category. This database 62 may be used to provide the values of column four of database 50 and is typically prepared manually. It will be understood that a column need not be actually populated but may simply be a reference to database 62.

It will be understood generally the database 50 (and optionally database 62) thus provide a guide for mapping subsequent packets 20, each associated with a numeric network address, to particular text domain names and optionally message categories obtained by matching the packet's numeric network address to a numeric address in column five which maps to a text domain name in column three and message category in column four. This process is provided by the packet classifier 38, as shown in FIG. 2, directly receiving all packets from the network tap 34 and reviewing the databases 50 and 62 as required.

Referring now to FIG. 7, as each new packet arrives at the packet classifier 38, as indicated by process block 70, the destination address 72 (shown in FIG. 5) of the packet 20 is reviewed and compared against the values in column five of database 50 as indicated by decision block 74. If there is a match, then as indicated by process block 76, statistics for that packet are logged in a log file in database 73 according to, for example, the corresponding text domain name in column five and/or the message category of column four based, as it is, on column five. Alternatively or in addition, rendezvous packets may be logged according to their error codes (column six) for query types (column two). If there is no match, the packet is binned as unknown as indicated by process block 81.

Referring now to FIG. 8, the present invention may provide output representations of the collected statistics of the log in database 73 in a variety of formats. As shown in FIG. 8, the rendezvous packets themselves may be characterized, for example, by plotting the request types, for example, request type 80a (A) and request type 80b (MX) on one side of a horizontal time axis 82 and symmetrically plotting the response codes, for example, response code 84a (NOERROR) and response code 84b (NXDOMAIN) on the opposite side of the horizontal time axis 82. This chart formulation emphasizes differences between queries and responses that may indicate certain types of network anomalies.

Alternatively as shown in FIG. 9, network statistics (for example the number of messages on the network 86), may be displayed as linked to text domain names 90. Thus, for example, the chart indicates that a given sampling of network traffic in the .com domain is predominantly from collegehumor.com.

Alternatively as shown in FIG. 10, a simple breakdown of network traffic as to network categories (column four of database 50) may be provided to indicate the types of traffic on the network. These charts may be produced by a logging component 91 shown generally in FIG. 2, producing charts 92.

This characterization of message categories of column four of database 50 may be used to provide improved quality of service for the network 18. Referring again to FIG. 2, the output of the packet classifier 38 may be used to provide input to a quality of service component 94, for example, that may block, buffer, steer or throttle particular packet 20 on the basis of the message categories to provide for desired quality of service. For example, identifying certain packets 20 as time critical VOIP packets allows them to be given a greater share of network bandwidth in times of high demand than noncritical file transfer type data.

The present invention has been described in terms of the preferred embodiment, and it is recognized that equivalents, alternatives, and modifications, aside from those expressly stated, are possible and within the scope of the appending claims.

We claim:

1. A network packet monitor for networks, such as the Internet, allowing intercommunication of data among computers by means of packets having numeric network destination addresses, the packet monitor comprising:
    a network tap for reading packets passing through a point on the network;
    a packet monitor communicating with the network tap to capture domain name server response packets responding to a domain name query in which a text domain name is converted into a numeric network address;
    a database communicating with the packet monitor, the database storing in association, at least one of a numeric network source address and a numeric network destination address, with a text domain name, all collected from the identified packets; and
    a packet characterizer communicating with the network monitor to identify other packets by matching at least one of a numeric network source address and numeric network destination address of the packets to associated text domain names in the database.

2. The network packet monitor of claim 1 further including a packet log outputting a report describing statistics of packets at the point on the network divided according to text domain names of the packets from the packet characterizer.

3. The network packet monitor of claim 2 further including a database linking text domain names to message categories of packet data, wherein the statistics of the packets are divided according to message categories.

4. The network packet monitor of claim 3 wherein the message categories are selected from a group consisting of real-time data and time non-critical data.

5. The network packet monitor of claim 3 wherein the message categories are selected from the group consisting of named, unnamed, and other data.

6. The network packet monitor of claim 2 wherein the text domain name may include both domain and subdomain names.

7. The network packet monitor of claim 2 wherein the report is a tree diagram showing statistics for text domain names each arranged according to a hierarchy of the text domain names.

8. The network packet monitor of claim 2 wherein report is a graph showing volumes of packets associated with different text domain names.

9. The network packet monitor of claim 2 wherein the database further stores domain name server query types for domain name server query packets and domain name server response codes for the domain name server response packets and wherein the packet log generates a report indicating a plot of query types as a function of time on one side of a time axis and a plot of response codes as a function of time, aligned with the query types, on the other side of the time axis.

10. The network packet monitor of claim 1 wherein the packet monitor further identifies response packets involving a non-domain name server rendezvous mechanism to identify hosts with which to rendezvous by numeric network address.

11. The network packet monitor of claim 1 further including a packet controller that determines packet treatment according to the text domain name associated with the packet by the packet characterizer.

12. A method of monitoring network packets on networks, such as the Internet, allowing intercommunication of data among computers by means of packets having numeric network destination addresses, comprising the steps of using an electronic computer programmed by a stored program to:
    (a) read packets passing through a point on the network;
    (b) capture domain name server response packets responding to a domain name query in which a text domain name is converted into a numeric network address, from the read packets;
    (c) store at least one of a numeric network source address and a numeric network destination address, with a text domain name, all collected from the examined packets; and
    (d) identify other packets by matching at least one of a numeric network source address and numeric network destination address of the packets to associated text domain names.

* * * * *